United States Patent
Tu et al.

(10) Patent No.: US 11,146,768 B2
(45) Date of Patent: Oct. 12, 2021

(54) PROJECTION SYSTEM AND PROJECTION METHOD

(71) Applicant: Coretronic Corporation, Hsin-Chu (TW)

(72) Inventors: Hsun-Cheng Tu, Hsin-Chu (TW); Chien-Chun Peng, Hsin-Chu (TW); Chi-Wei Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/799,723

(22) Filed: Feb. 24, 2020

(65) Prior Publication Data
US 2020/0280706 A1 Sep. 3, 2020

(30) Foreign Application Priority Data
Feb. 28, 2019 (CN) .......................... 201910151028.8

(51) Int. Cl.
*H04N 9/31* (2006.01)

(52) U.S. Cl.
CPC ......... *H04N 9/3185* (2013.01); *H04N 9/3194* (2013.01)

(58) Field of Classification Search
CPC .. H04N 9/3185; H04N 9/3194; H04N 9/3147; H04N 9/3179
USPC ........................................................ 348/745
See application file for complete search history.

(56) References Cited

U.S. PATENT DOCUMENTS

| | | | | |
|---|---|---|---|---|
| 9,774,837 | B2* | 9/2017 | Chang | H04N 9/3185 |
| 2009/0002510 | A1* | 1/2009 | Uchihashi | H04N 9/3194 |
| | | | | 348/222.1 |
| 2015/0213584 | A1* | 7/2015 | Ishikawa | G09G 5/377 |
| | | | | 345/637 |
| 2016/0216778 | A1* | 7/2016 | Yu | G06F 3/0317 |
| 2017/0223322 | A1* | 8/2017 | Grundhofer | H04N 9/3129 |
| 2017/0310946 | A1* | 10/2017 | Ge | H04N 13/286 |
| 2019/0005607 | A1* | 1/2019 | Tamai | H04N 9/3194 |
| 2019/0102907 | A1* | 4/2019 | Someya | G06F 3/1446 |

(Continued)

FOREIGN PATENT DOCUMENTS

| | | |
|---|---|---|
| CN | 105376540 | 3/2016 |
| TW | I454147 | 9/2014 |
| TW | I639340 | 10/2018 |

*Primary Examiner* — Michael Lee
(74) *Attorney, Agent, or Firm* — JCIPRNET

(57) ABSTRACT

A projection system and a projection method are provided. The projection system includes a processing module, a projection module and a photographing module. The projection module is coupled to the processing module, and projects a first projection image including a first asymmetric graph. The photographing module is coupled to the processing module, and captures at least a part of the first projection image based on a photographing range, so as to output a first photographed image including at least one second asymmetric graph. The processing module analyzes the first photographed image to determine whether the at least one second asymmetric graph is consistent with a geometric configuration of the first asymmetric graph. The processing module determines an effective photographing area according to one of the at least one second asymmetric graph that is consistent with the geometric configuration of the first asymmetric graph in the first photographed image.

20 Claims, 7 Drawing Sheets

(56) References Cited

U.S. PATENT DOCUMENTS

| | | | |
|---|---|---|---|
| 2019/0281266 A1* | 9/2019 | Urano | H04N 9/3147 |
| 2019/0394435 A1* | 12/2019 | Uemura | G06T 3/00 |
| 2020/0128219 A1* | 4/2020 | Katsuki | H04N 9/3147 |

* cited by examiner

PROJECTION SYSTEM AND PROJECTION METHOD

CROSS-REFERENCE TO RELATED APPLICATION

This application claims the priority benefit of China application serial no. 201910151028.8, filed on Feb. 28, 2019. The entirety of the above-mentioned patent application is hereby incorporated by reference herein and made a part of this specification.

BACKGROUND

Technical Field

The invention relates to a display technique, and particularly relates to a projection system and projection method.

Description of Related Art

Along with increase of projection demand, how to adapt a projector design to various projection environments to provide good projection effect is one of the important research and development directions in the field of projectors. For example, when a surrounding projection environment of a projection range of the projector has a mirror or other area that may reflect a projection image, the projector may misjudge an effective projection area. Moreover, when the projector is applied to a non-planar projection surface or a non-fixed curvature varied projection surface, a user needs to manually adjust projection parameters of the projector repeatedly in order to complete projection positioning. Moreover, in some application situations, if multiple projectors need to be integrated into one projection system to provide a large-area projection effect, the user need to manually adjust these projectors one by one, which leads to increase of an erection time and cost of the projection system. Therefore, how to make a single projector or the projection system integrated by multiple projectors to effectively perform projection positioning to accurately project a projection image on the projection surface is an important issue, and solutions of several embodiments are provided below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system and a projection method adapted to determine an effective photographing area, by which a projection positioning function may be correctly executed, so as to provide a good projection effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to achieve one or a portion of or all of the objects or other objects, an embodiment of the invention provides a projection system including a processing module, a projection module and a photographing module. The projection module is coupled to the processing module. The projection module is configured to project a first projection image. The first projection image includes a first asymmetric graph. The photographing module is coupled to the processing module. The photographing module is configured to capture at least a part of the first projection image based on a photographing range, so as to output a first photographed image. The first photographed image includes at least one second asymmetric graph. The processing module analyzes the first photographed image to determine whether the at least one second asymmetric graph is consistent with a geometric configuration of the first asymmetric graph. The processing module determines an effective photographing area according to one of the at least one second asymmetric graph that is consistent with the geometric configuration of the first asymmetric graph in the first photographed image.

In order to achieve one or a portion of or all of the objects or other objects, an embodiment of the invention provides a projection method including following steps: projecting a first projection image, wherein the projection image includes a first asymmetric graph; capturing at least a part of the first projection image based on a photographing range, so as to output a first photographed image, wherein the first photographed image includes at least one second asymmetric graph; analyzing the first photographed image to determine whether the at least one second asymmetric graph is consistent with a geometric configuration of the first asymmetric graph; and determining an effective photographing area according to one of the at least one second asymmetric graph that is consistent with the geometric configuration of the first asymmetric graph in the first photographed image.

Based on the above description, the embodiments of the invention have at least one of following advantages or effects. The projection system and projection method of the invention may first project an asymmetric graph, and analyze whether the asymmetric graph in the photographed image output by the photographing module is consistent with the geometric configuration of the asymmetric graph of the projection image projected by the projection module, so as to determine the effective photographing area of the photographing module, and perform projection positioning to the projection module, such that the projection system may have good projection effect.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
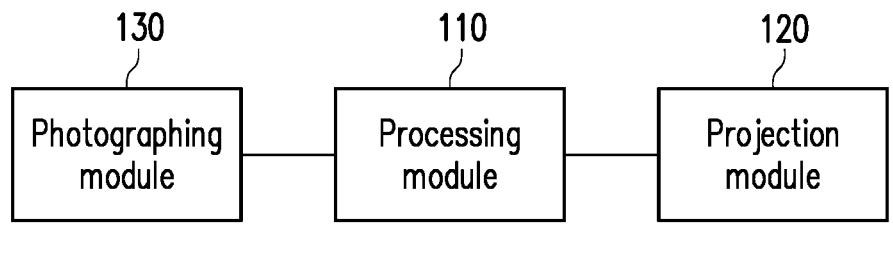
FIG. 1 is a functional block diagram of a projection system according to an embodiment of the invention.

FIG. 1 is a functional block diagram of a projection system according to an embodiment of the invention. Referring to FIG. 1, the projection system 100 includes a processing module 110, a projection module 120 and a photographing module 130. The processing module 110 is coupled to the projection module 120 and the photographing module 130. In the embodiment, the projection module 120 is configured to project a projection image to a projection surface, and the photographing module 130 is configured to capture the projection image projected by the projection module 120 to output a corresponding photographed image to the processing module 110. In the embodiment, since a surrounding environment of the projection surface may exist a mirror or an area that may reflect the projection image, the photographed image captured by the photographing module 130 may contain a plurality of repeated projected and reflected projection image content, or contain other noises generated due to reflection of the projection image of the projection surface. Therefore, in order to avoid misjudgement occurred during a projection positioning process of the projection module 120, the projection system 100 of the embodiment first determines an effective photographing area, and then performs the projection positioning.

To be specific, first, the projection module 120 projects a first projection image, and the photographing module 130 captures at least a part of the first projection image based on a photographing range, so as to output a first photographed image. The first projection image may include a first asymmetric graph, and the first photographed image output by the photographing module 130 may include one or a plurality of second asymmetric graphs corresponding to the first asymmetric graph. In this way, the processing module 110 may analyze the first photographed image provided by the photographing module 130 to determine whether each of the second asymmetric graphs in the first photographed image is consistent with a geometric configuration of the first asymmetric graph. If a certain second asymmetric graph in the first photographed image provided by the photographing module 130 is consistent with the geometric configuration of the first asymmetric graph, the processing module 110 determines an effective photographing area according to the certain second asymmetric graph that is consistent with the geometric configuration the first asymmetric graph in the first photographed image. For example, the processing module 110 takes the certain second asymmetric graph as a center of the effective photographing area, and determines the effective photographing area according to a predetermined range.

Then, the processing module 110 may analyze a geometric configuration result of the certain second asymmetric graph that is consistent with the geometric configuration of the first asymmetric graph in the first photographed image to deduce a proper full grid point projection image, wherein the geometric configuration result refers to, for example, a graph size, length, width, or a graphic proportional relationship, etc., presented by the asymmetric image based on a deformation result of the projection surface. The proper full grid point projection image refers to, for example, a deformation result of the projection surface corresponding to a distance relationship between a plurality of grid points arranged in an array in the full grid point projection image. Then, the processing module 110 may operate the projection module 120 to project the deduced full grid point projection image, and the photographing module 130 captures at least a part of the full grid point projection image based on the aforementioned effectively photographing area to output a full grid point photographed image. In the embodiment, the processing module 110 sequentially compares a plurality of grid point coordinates of a plurality of positioning grid points of the full grid point photographed image with a plurality of predetermined grid point coordinates, so as to determine whether to adjust the predetermined grid point coordinates. Moreover, after determination of the full grid point photographed image is completed, the projection system 100 may determine an actual projection result of the projection image according to the plurality of predetermined grid point coordinates. Therefore, the projection system 100 of the embodiment may provide good projection result.

In the embodiment, the processing module 110 may include a Central Processing Unit (CPU) with an image data analysis and processing function, or other programmable general purpose or special purpose microprocessor, an Image Processing Unit (IPU), a graphics Processing Unit (GPU), a Digital Signal Processor (DSP), an Application Specific Integrated Circuits (ASIC), a Programmable Logic Device (PLD), other similar operation circuits or a combination of the above circuits. Moreover, the processing module 110 may be further coupled to a memory, and related image data, image analysis software and image processing software required for implementing the projection system and the projection method of the invention may be stored to the memory for the processing module 110 to read and execute.

In the embodiment, the projection module 120 may be a projector, and may further include a light source module (for example, a light-emitting device with a discharge bulb, a light-emitting diode or a laser light source), an optical engine (with a light modulator, for example, a reflective or transmissive spatial light modulator, wherein the reflective spatial light modulator is a reflective Liquid Crystal On Silicon (LCOS) or a Digital Micro-mirror Device (DMD), etc., and the transmissive spatial light modulator is, for example, a transparent liquid crystal panel). Moreover, based on different ways of inputting a control signal, the light modulator is, for example, an Optically Addressed Spatial Light Modulator (OASLM) or an Electrically Addressed Spatial Light Modulator (EASLM), a projection lens group (including a plurality of lenses) and an image output unit (for example, an I/O port or interface for outputting signals, which transmits video signals or control signals through Bluetooth, Wi-Fi, Zigbee or other wireless manner, or transmits the same by using optical fiber or other wired transmission interface), etc., and the similar related circuit component.

In the embodiment, the photographing module 130 may include a camera. The photographing module 130 and the projection module 120 may be disposed in a same projection device, or the photographing module 130 and the projection module 120 may be independently disposed, which is not limited by the invention. Moreover, in an embodiment, the photographing module 130 may have a wide-angle lens, a fish-eye lens, or other type of lens.

Figure 2:
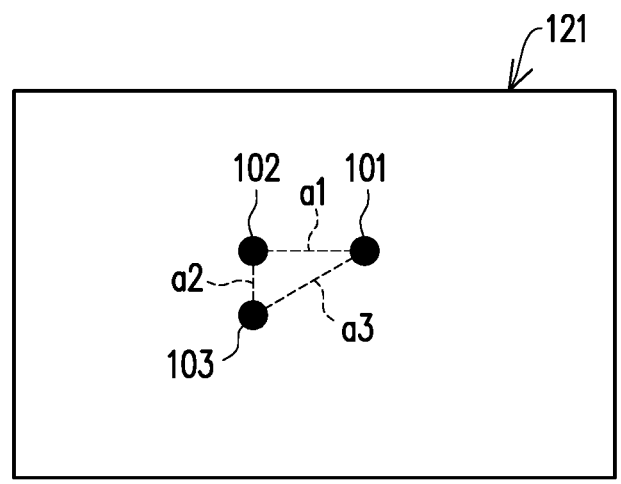
FIG. 2 is a schematic diagram of a first projection image according to an embodiment of the invention.

FIG. 2 is a schematic diagram of a first projection image according to an embodiment of the invention. Referring to FIG. 1 and FIG. 2, in the embodiment, the projection module 120 may project a first projection image 121 shown in the embodiment of FIG. 2. The first projection image 121 may include a first asymmetric graph composed of positioning grid points 101-103. The positioning grid points 101-103 are arranged in a right triangle, and a plurality of distances between the positioning grid points 101-103 are unequal distances. In detail, a distance a1 between the positioning grid point 101 and the positioning grid point 102, a distance a2 between the positioning grid point 102 and the positioning grid point 103, and a distance a3 between the positioning grid point 101 and the positioning grid point 103 are not equal. However, the asymmetric graph of the invention is not limited to be composed of the positioning grid points. In an embodiment, the asymmetric graph projected by the projection module 120 may also be other asymmetric graph, for example, an English letter, a number, etc., or other graphs with the same asymmetric property.

It should be noted that the distances between the positioning grid points 101-103 may be designed to be free from a deformation influence of the projection surface. For example, the distance a2 between the positioning grid point 102 and the positioning grid point 103 may be designed to be far greater than the distance a1 between the positioning grid point 101 and the positioning grid point 102. Therefore, in the case of minimum projection, even if the projection surface is a curved surface or other non-planar surface, the plurality of positioning grid points in the first photographed image obtained by the photographing module 130 are still kept to the situation that the distance between any two positioning grid points are unequal, without affecting the analysis result of the effective photographing area.

Figure 3:
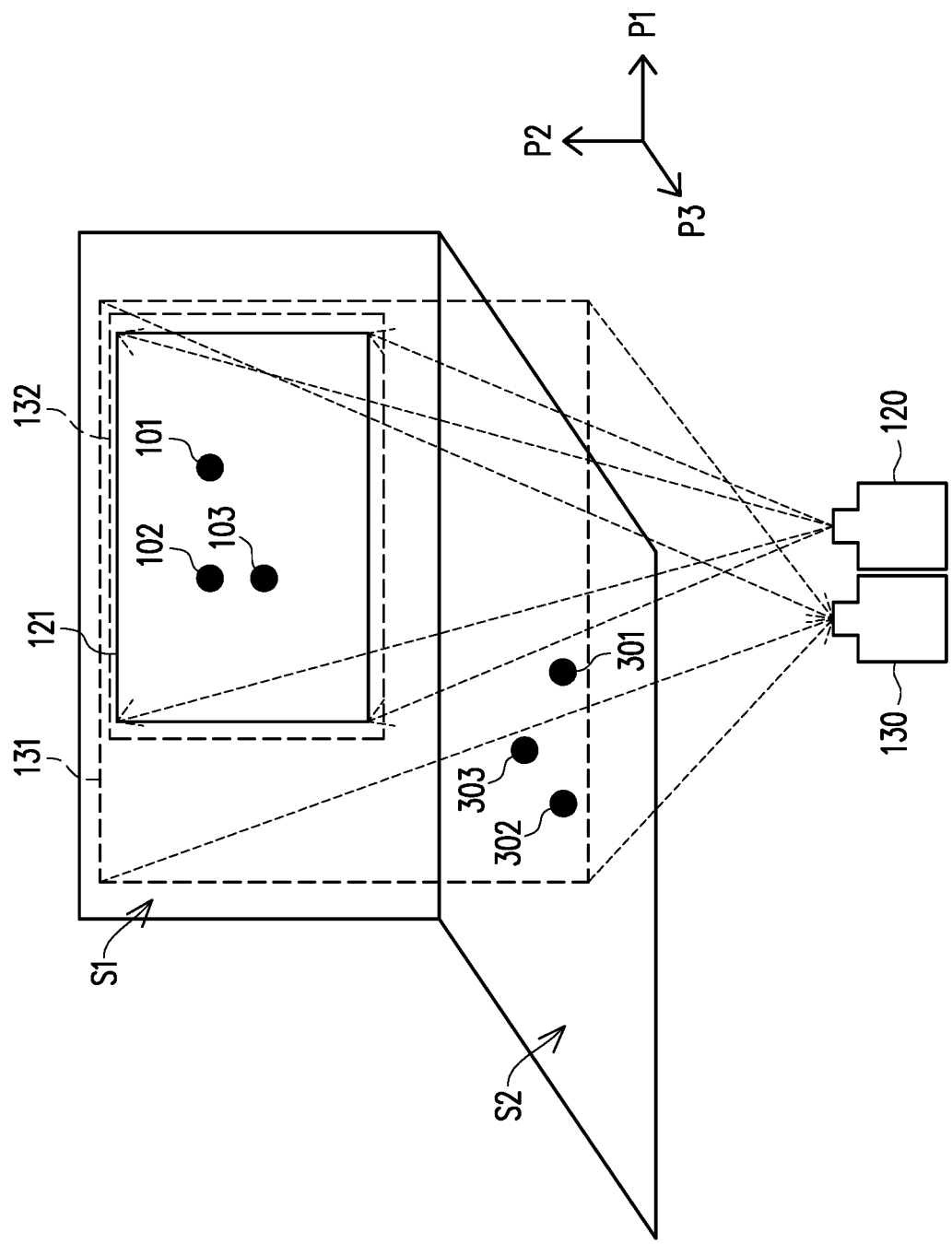
FIG. 3 is a schematic diagram of a first projection image according to an embodiment of the invention.

FIG. 3 is a schematic diagram of a first projection image according to an embodiment of the invention. Referring to FIG. 1 to FIG. 3, the projection environment of the embodiment, for example, includes a projection surface S1 and a ground surface S2 having an effect of reflecting image content of the projection surface S1 (or other mirror surface having a high reflection effect). The projection surface S1 is a plane formed by a first direction P1 and a second direction P2. The ground surface S2 is a plane formed by the first direction P1 and the third direction P3. The first direction P1, the second direction P2 and the third direction P3 are perpendicular to each other. In the embodiment, when the projection module 120 projects the first projection image 121 to the projection surface S1, the ground surface S2 may reflect the projection content of the projection surface S1 at the same time. In other words, when the photographing module 130 captures the first projection image 121, the photographing module 130 may obtain a first photographed image including the images of the projection surface S1 and the ground surface S1 from a photographing range 131, so that the processing module 110 may determine the positioning grid points 101-103 projected to the projection surface S1 and positioning grid points 301-303 reflected to the ground surface S2 at the same time. The positioning grid points 301-303 respectively correspond to the positioning grid points 101-103.

Since the positioning grid points 101-103 are arranged in the asymmetrical relationship as shown in FIG. 2, the processing module 110 may determine whether the plurality sets of positioning grid points in the first photographed image is consistent with a geometric configuration of the positioning grid points 101-103 in the first projection image 121 projected by the projection module 120, so as to determine a range and position of an effective photographing area 132. The effective photographing area 132 may correspond to a region of the first projection image 121. Further, since the geometric configuration of the positioning grid points 301-303 reflected by the ground surface S2 is not the same with the arrangement of the positioning grid points 101-103, and the distance relationships between the positioning grid points 301-303 are different from that of the positioning grid points 101-103, the processing module 110 may determine that the region of the positioning grid points 301-303 is a not the effective photographing area. Therefore, the processing module 110 may effectively exclude areas in the first photographed image that are inconsistent with the geometric configuration of the positioning grid points 101-103, so as to correctly determine the effective photographing area 132 in the photographing range 131. However, in an embodiment, the effective photographing area 132 may cover at least a part of the area of the first projection image 121 without being limited by FIG. 3.

Figure 4:
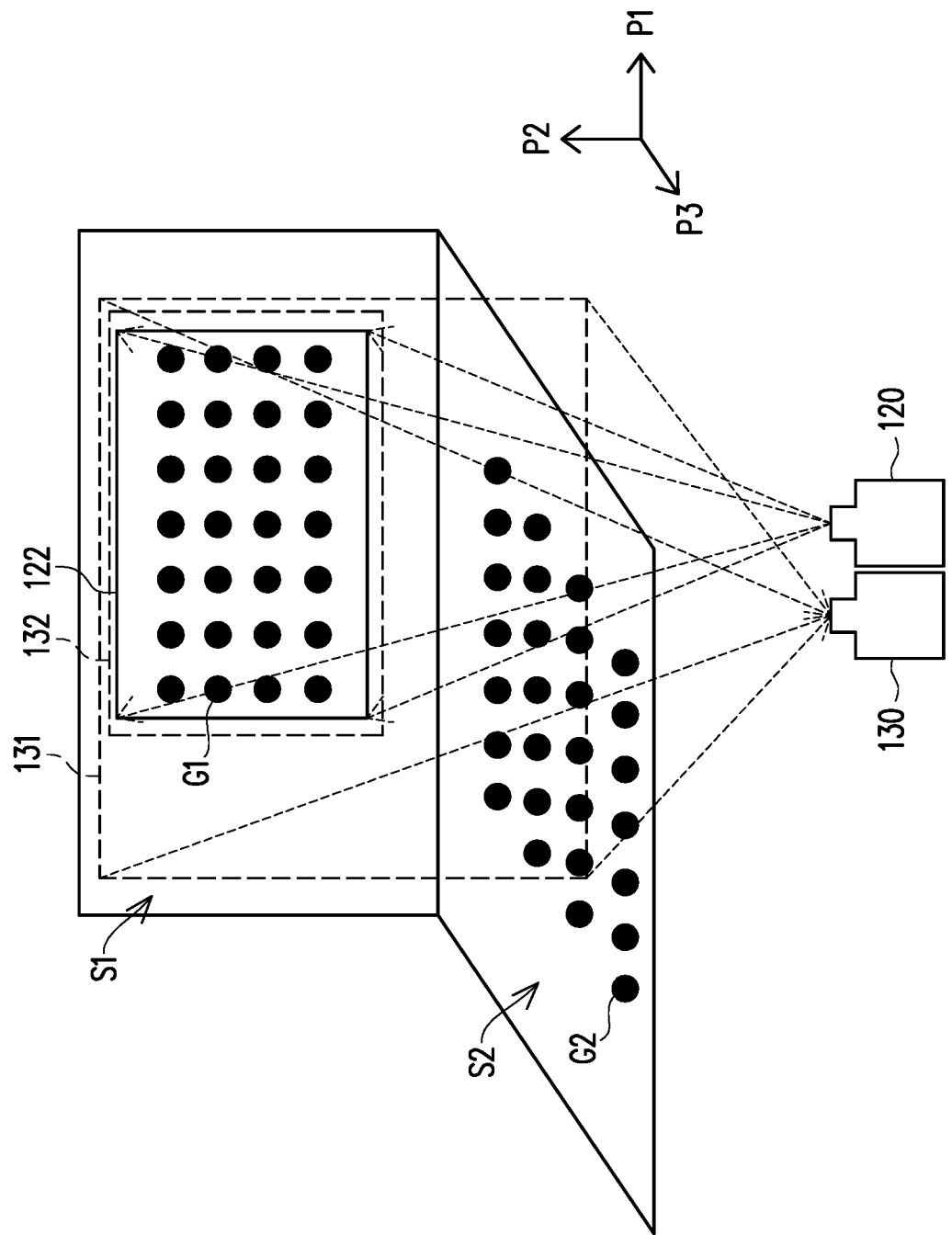
FIG. 4 is a schematic diagram of a full grid point projection image according to an embodiment of the invention.

FIG. 4 is a schematic diagram of a full grid point projection image according to an embodiment of the invention. Referring to FIG. 1 and FIG. 4, in the embodiment, after the projection system 100 determines the effective photographing area 132 as that described in the embodiment of FIG. 3, the projection system 100 may continually execute a projection positioning operation. In the embodiment, the projection module 120 projects a full grid point projection image 122 on the projection surface S1. The full grid point projection image 122 includes a plurality of positioning grid points G1 arranged in an array. It should be noted that the processing module 110 may generate the corresponding full grid point projection image 122 according to the result that the photographing module 130 captures the positioning grid points 101-103 as that described in the embodiment of FIG. 3. In detail, the processing module 110 may analyze the three positioning grid points 101-103 corresponding to the first projection image 121 in the first photographed image to obtain three grid point coordinates of the three positioning grid points. Moreover, the processing module 110 may deduce a plurality of predetermined grid point coordinates of a plurality of predetermined positioning grid points within the whole projection range according to the three grid point coordinates, and determine a projection result of the projection module 120 within the projection range according to the plurality of predetermined grid point coordinates.

In other words, if the projection surface S1 is a curved surface, the processing module 110 may preset the plurality of positioning grid points G1 according to a change of distances between each two of the positioning grid points 101-103 captured by the photographing module 130. However, since the projection surface S1 may be a curved surface with a non-fixed curvature, in order to avoid projection distortion, the projection system 100 of the embodiment further corrects predetermined grid point coordinates of the plurality of positioning grid points G1. It should be noted that the predetermined grid point coordinates are used as an image deformation reference of the actual projection image, such that the projection module 120 may project the projection image onto the non-planar projection surface S1, and the photographing module 130 may obtain a normal photographed image.

To be specific, the projection module 120 may project the full grid point projection image 122 on the projection surface S1, and the full grid point projection image 122 includes the plurality of positioning grid points G1. The photographing module 130 obtains the photographed image based on the photographing range 131, and further captures at least a part of the full grid point projection image 122 based on the effective photographing area 132, so as to output a full grid point photographed image 122 to the processing module 110. Therefore, the full grid point photographed image 122 does not include the plurality of positioning grid points G2 reflected by the ground surface S2. In the embodiment, the processing module 110 sequentially compares a plurality of grid point coordinates of a plurality of positioning grid points of the full grid point photographed image 122 with a plurality of predetermined grid point coordinates of the positioning grid points G1, so as to determine whether to adjust the predetermined grid point coordinates of the positioning grid points G1.

In other words, since a distance relationship between a part of the positioning grid points obtained by the photographing module 130 according to the effective photographing area 132 may have different result on different projection surfaces (which may be non-fixed curvature or arbitrary non-planar surfaces), the processing module 110 of the embodiment compares the plurality of grid point coordinates of the plurality of positioning grid points of the full grid point photographed image with a corresponding part of the plurality of predetermined grid point coordinates of the plurality of positioning grid points G1 one by one, so as to correct the plurality of predetermined grid point coordinates of the plurality of positioning grid points G1.

For example, when the processing module 110 determines that a difference between at least one of the plurality of positioning grid points G1 and at least one of the plurality of positioning grid points captured by the photographing module 130 is smaller than or equal to a difference threshold, the processing module 110 replaces at least one of the plurality of predetermined grid point coordinates of the plurality of positioning grid points G1 by at least one of the plurality of grid point coordinates of the plurality of positioning grid points provided by the photographing module 130. Comparatively, when the processing module 110 determines a coordinate difference between at least another one of the plurality of positioning grid points G1 and at least another one of the plurality of positioning grid points captured by the photographing module 130 is greater than the difference threshold, the processing module 110 maintains the at least another one of the plurality of predetermined grid point coordinates.

In other words, if positions of the plurality of positioning grid points of the full grid point photographed image output by the photographing module 130 have little difference with positions of the corresponding positioning grid points G1, the processing module 110 determines such difference as a normal curved surface variation of the projection surface S1. In this case, the processing module 110 corrects the corresponding predetermined grid point coordinates, so that the processing module 110 may perform corresponding adjustment on adjacent grid points around each of the positioning grid points G1 according to the corrected predetermined grid point coordinates. Therefore, the projection result is changed along with the projection surface S1.

Comparatively, if positions of the plurality of positioning grid points of the full grid point photographed image 122 output by the photographing module 130 have an obvious difference with positions of the corresponding predetermined positioning grid points, the processing module 110 determines such difference as that the projection surface S1 and the projection module 120 may have a blocking object, for example, a person or an article. In this case, the processing module 110 does not correct the corresponding predetermined grid point coordinates, so that the processing module 110 may project according to the originally deduced predetermined grid point coordinates. Therefore, the projection result is not changed along with the blocking object.

In an embodiment, the above difference may be determined by at least one of a direction variation amount and a distance variation amount between each of a corresponding part of the plurality of predetermined grid point coordinates of the plurality of positioning grid points G1 and each of the plurality of grid point coordinates in the full grid point photographed image 122 output by the photographing module 130, and the different threshold is, for example, an angle threshold or a distance threshold. However, in another embodiment, the aforementioned difference may also be determined by at least one of a contrast variation amount and a deformation amount between each of a corresponding part of the plurality of predetermined grid point coordinates of the plurality of positioning grid points G1 and each of the plurality of grid point coordinates in the full grid point photographed image 122 output by the photographing module 130, and the different threshold is, for example, a contrast threshold or a deformation threshold.

Figure 5:
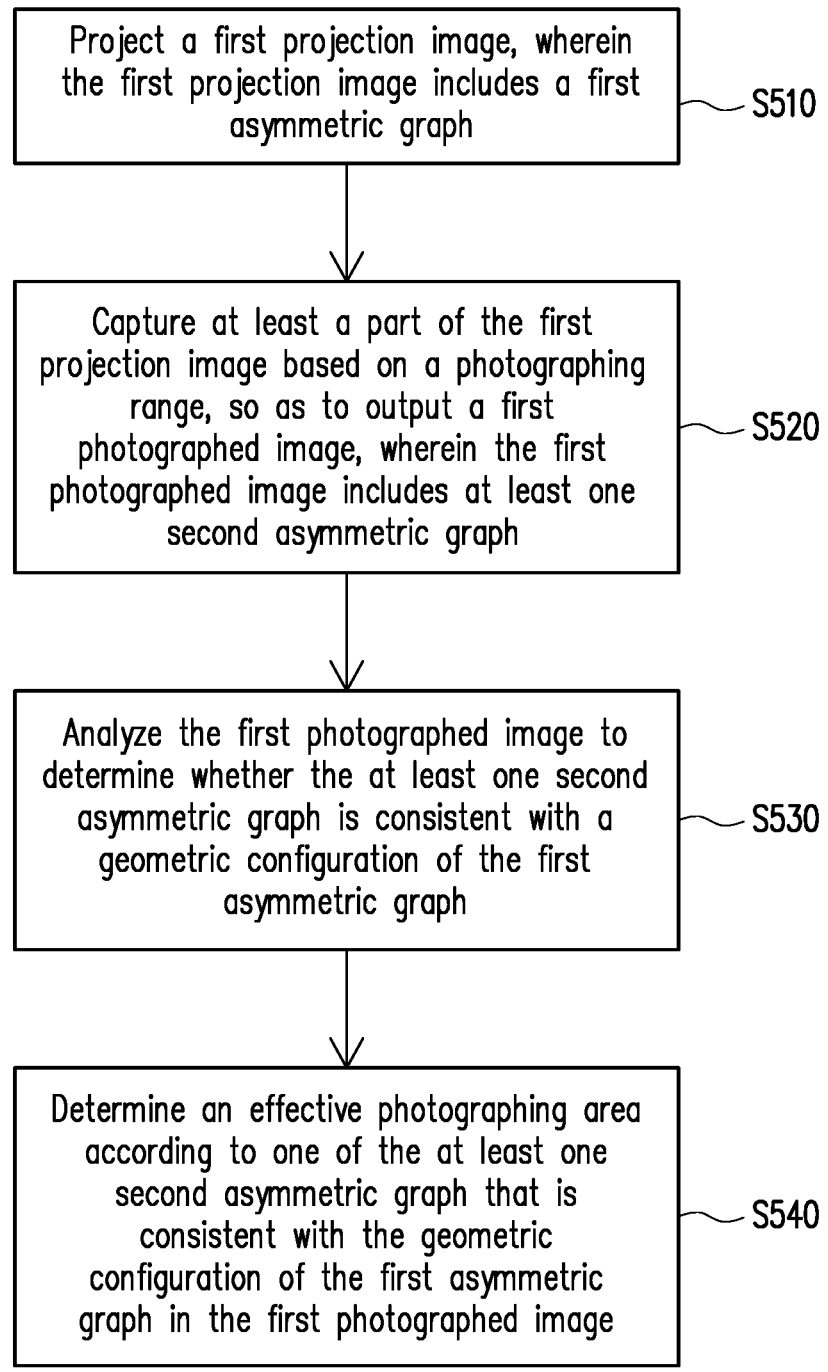
FIG. 5 is a flowchart illustrating a projection method according to an embodiment of the invention.

FIG. 5 is a flowchart illustrating a projection method according to an embodiment of the invention. Referring to FIG. 1, FIG. 3 and FIG. 5, the projection system 100 may execute following steps S510-S540. In the step S510, the projection module 120 projects the first projection image 121, wherein the first projection image 121 includes a first asymmetric graph. The first asymmetric graph is, for example, composed of the positioning grid points 101-103. In the step S520, the photographing module 130 captures at least a part of the first projection image 121 based on the photographing range 131, so as to output a first photographed image, wherein the first photographed image includes at least one second asymmetric graph. The at least one second asymmetric graph, for example, includes a graph composed of the positioning grid points 101-103 or a graph composed of the positioning grid points 301-303 reflected by the ground surface S2. In the step S530, the processing module 110 analyzes the first photographed image to determine whether the at least one second asymmetric graph is consistent with a geometric configuration of the first asymmetric graph. In the step S540, the processing module 110 determines the effective photographing area 132 according to one of the at least one second asymmetric graph that is consistent with the geometric configuration of the first asymmetric graph in the first photographed image. Therefore, the projection method of the embodiment may effectively avoid misjudgment of the projection system 100 through a determination result of the effective photographing area.

Moreover, with regard to related module features, technical details, and implementation methods of the projection system 100 of the embodiment, sufficient instructions, recommendations, and implementation descriptions may be obtained by referring to the descriptions of the embodiments of FIGS. 1 to 4, and details thereof are not repeated.

Figure 6A:
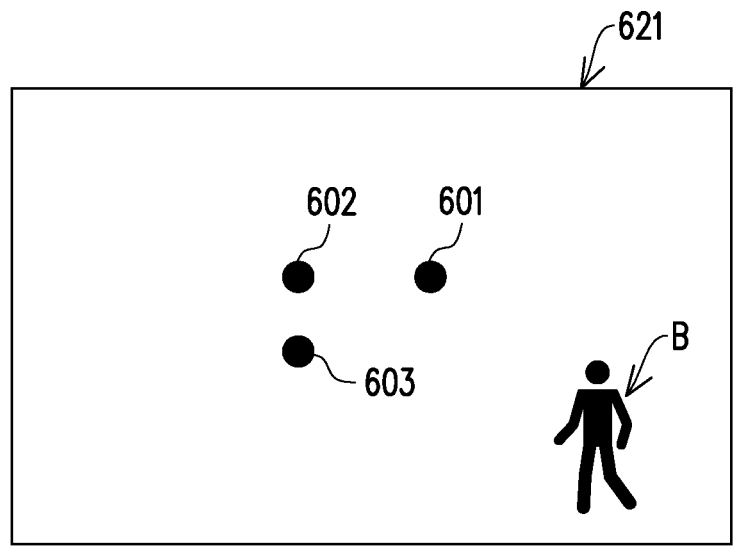
FIG. 6A is a schematic diagram of a first photographed image according to an embodiment of the invention.
Figure 6B:
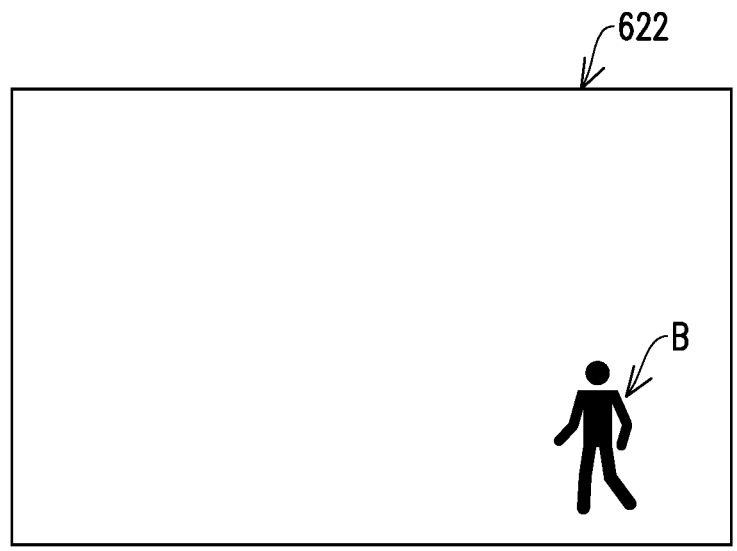
FIG. 6B is a schematic diagram of a second photographed image according to an embodiment of the invention.

FIG. 6A is a schematic diagram of the first photographed image according to an embodiment of the invention. FIG. 6B is a schematic diagram of a second photographed image according to an embodiment of the invention. Referring to FIG. 1, FIG. 6A and FIG. 6B, before the operation of determining the effective photographing area is performed, the projection system 100 pre-determines whether the current situation is an effective projection situation. Taking a situation that an obstacle B (for example, a moving or non-moving person) exists between the projection system 100 and the projection surface as shown in FIG. 6A and FIG. 6B as an example, first, the projection module 120 projects the first projection image on the projection surface, and the photographing module 130 captures at least a part of the first projection image based on the photographing range, so as to output a first photographed image 621. Since the obstacle B exists between the projection system 100 and the projection surface, the first photographed image 621 output by the photographing module 130 may include images of the positioning grid points 601-603 and the obstacle B. Then, the projection module 120 projects a second projection image on the projection surface, and the photographing module 130 captures at least a part of the second projection image based on the photographing range, so as to output a second photographed image 622. The second projection image may be a blank projection image, so that the second photographed image 622 output by the photographing module 130 may only include an image of the obstacle B.

In other words, the photographing module 130 may quickly and continuously capture and output the first photographed image 621 and the second photographed image 622, so that regardless of whether the obstacle B between the projection system 100 and the projection surface is moving or not, the image of the obstacle B has a same position in the first photographed image 621 and the second photographed image 622. Therefore, the processing module 110 may compare the first photographed image 621 and the second photographed image 622 to determine that the positioning grid points 601-603 are the projection image content projected by the projection module 120, and the obstacle B is not the projection image content projected by the projection module 120. In this way, the processing module 110 determines that the current projection is a non-effective projection, and re-projects the first projection image until the image of the obstacle B does not exist in the first photographed image 621 and the second photographed image 622 captured by the photographing module 130. Therefore, the situation that the projection system 100 performs wrong or improper determining operation of the effective photographing area and projection positioning operation when the obstacle B exists between the projection system 100 and the projection surface may be effectively avoided.

Figure 7:
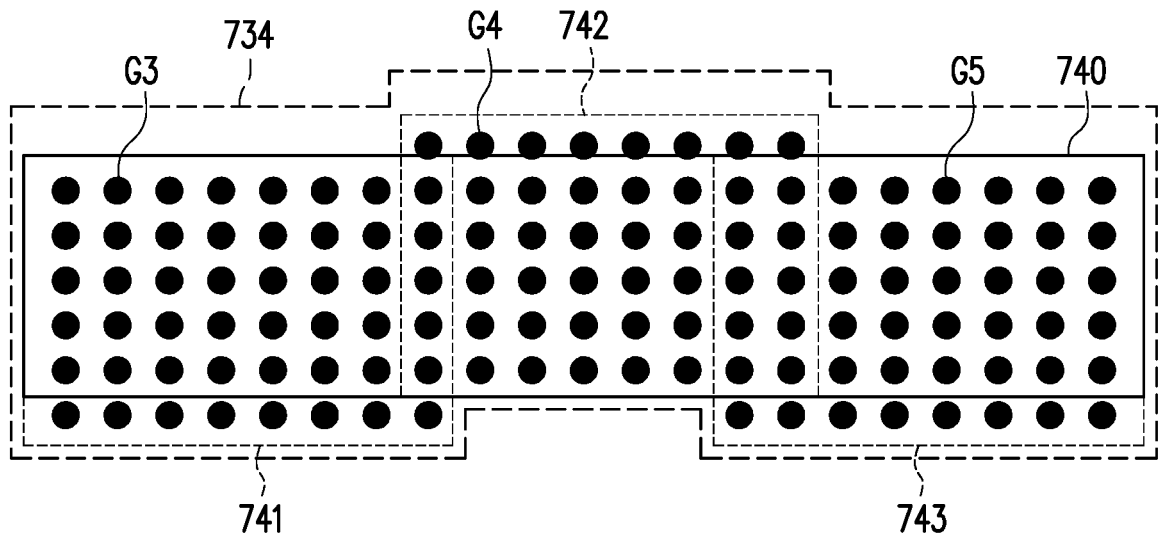
FIG. 7 is a schematic diagram of splicing a plurality of projection ranges according to an embodiment of the invention.
Figure 8:
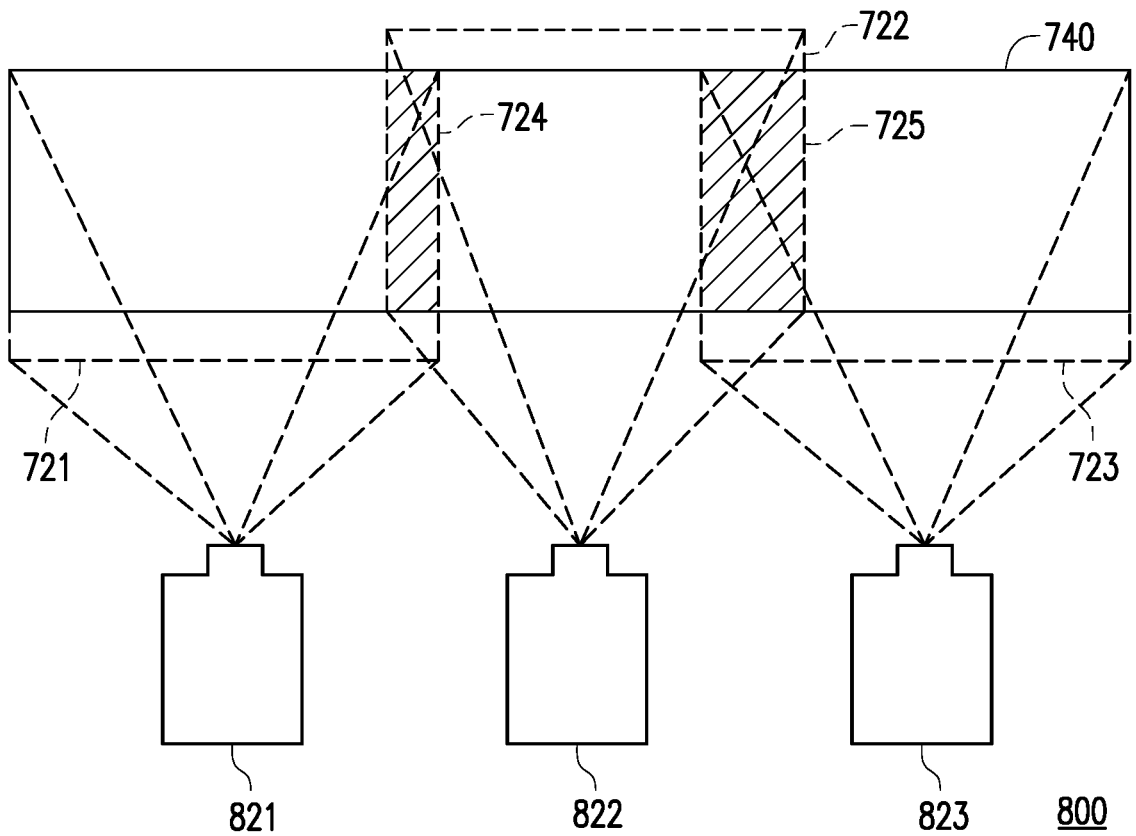
FIG. 8 is a projection schematic diagram of a projection system having a plurality of projection modules according to an embodiment of the invention.

FIG. 7 is a schematic diagram of splicing a plurality of projection ranges according to an embodiment of the invention. FIG. 8 is a projection schematic diagram of a projection system having a plurality of projection modules according to an embodiment of the invention. The projection system 800 is the same to the projection system 100, and a difference there between is that the projection system 800 may include a first projection module 821, a second projection module 822 and a third projection module 823, and may include one or a plurality of photographing modules (not shown). The one or plurality of photographing modules may be disposed on at least one of the first projection module 821, the second projection module 822 and the third projection module 823, or may be configured independently from the first projection module 821, the second projection module 822 and the third projection module 823, which is not limited by the invention.

In the embodiment, the photographing module may first execute the aforementioned operation of determining the effective photographing area as that described in the embodiments of FIG. 1 to FIG. 3 to determine a first effective photographing area, a second effective photographing area and a third effective photographing area corresponding to the first projection module 821, the second projection module 822 and the third projection module 823. In the embodiment, the first effective photographing area, the second effective photographing area and the third effective photographing area may be combined into an integral effective photographing area 734 as shown in FIG. 7. Moreover, the first projection module 821, the second projection module 822 and the third projection module 823 may then sequentially execute the aforementioned projection positioning operation as that described in the embodiments of FIG. 4 and FIG. 5 to respectively project the respective full grid point projection images in respective projection ranges 721-723, and the projection ranges 721-723 include overlapped projection areas 724 and 725 there between. As shown in FIG. 7, the full grid point projection images respectively projected by the projection modules 821-823 include a plurality of first predetermined positioning grid points G3, a plurality of second predetermined positioning grid points G4, and a plurality of third predetermined positioning grid points G5 arranged in an array.

In the embodiment, the photographing module may obtain full grid point photographed images 741-743 as shown in FIG. 7 based on the integral effective photographing area 734. The full grid point photographed images 741-743 correspond to the projection ranges 721-723. In the embodiment, when the first projection module 821, the second projection module 822 and the third projection module 823 respectively complete the projection positioning, the processing module (not shown) of the projection system 800 may perform merging and splicing operation of the projection images according to the plurality of first predetermined positioning grid points G3, the plurality of second predetermined positioning grid points G4, and the plurality of third predetermined positioning grid points G5 respectively corresponding to the first projection module 821, the second projection module 822 and the third projection module 823.

For example, the processing module of the projection system 800 may determine and obtain a spliced projection range 740 according to a plurality of predetermined grid point coordinates of the plurality of first predetermined positioning grid points G3, the plurality of second predetermined positioning grid points G4, and the plurality of third predetermined positioning grid points G5. For example, the processing module of the projection system 800 may respectively determine X-axis coordinate values and Y-axis coordinate values of the plurality of predetermined grid point coordinates corresponding to the plurality of first predetermined positioning grid points G3, the plurality of second predetermined positioning grid points G4, and the plurality of third predetermined positioning grid points G5 to obtain the rectangular spliced projection range 740 capable of respectively covering the maximum projection area of each of the projection ranges 721-723. In other words, an area of the spliced projection range 740 may be smaller than or equal to a sum of the areas of the projection ranges 721-723.

In the embodiment, the first projection module 821, the second projection module 822 and the third projection module 823 may be combined to project a single projection image in the spliced projection range 740, and portions of the projection ranges 721-723 exceeding the spliced projection range 740 do not have the projection image or have predetermined color, for example, black color or white color. Moreover, as shown in FIG. 8, in the overlapped projection area 724 within the spliced projection range 740, the first projection module 821 and the second projection module 822 may project the same projection image, and in the overlapped projection area 725 within the spliced projection range 740, the second projection module 822 and the third projection module 823 may project the same projection image. Therefore, the projection system 800 of the embodiment may effectively perform projection correction and provide good large-area spliced projection effect.

Figure 9:
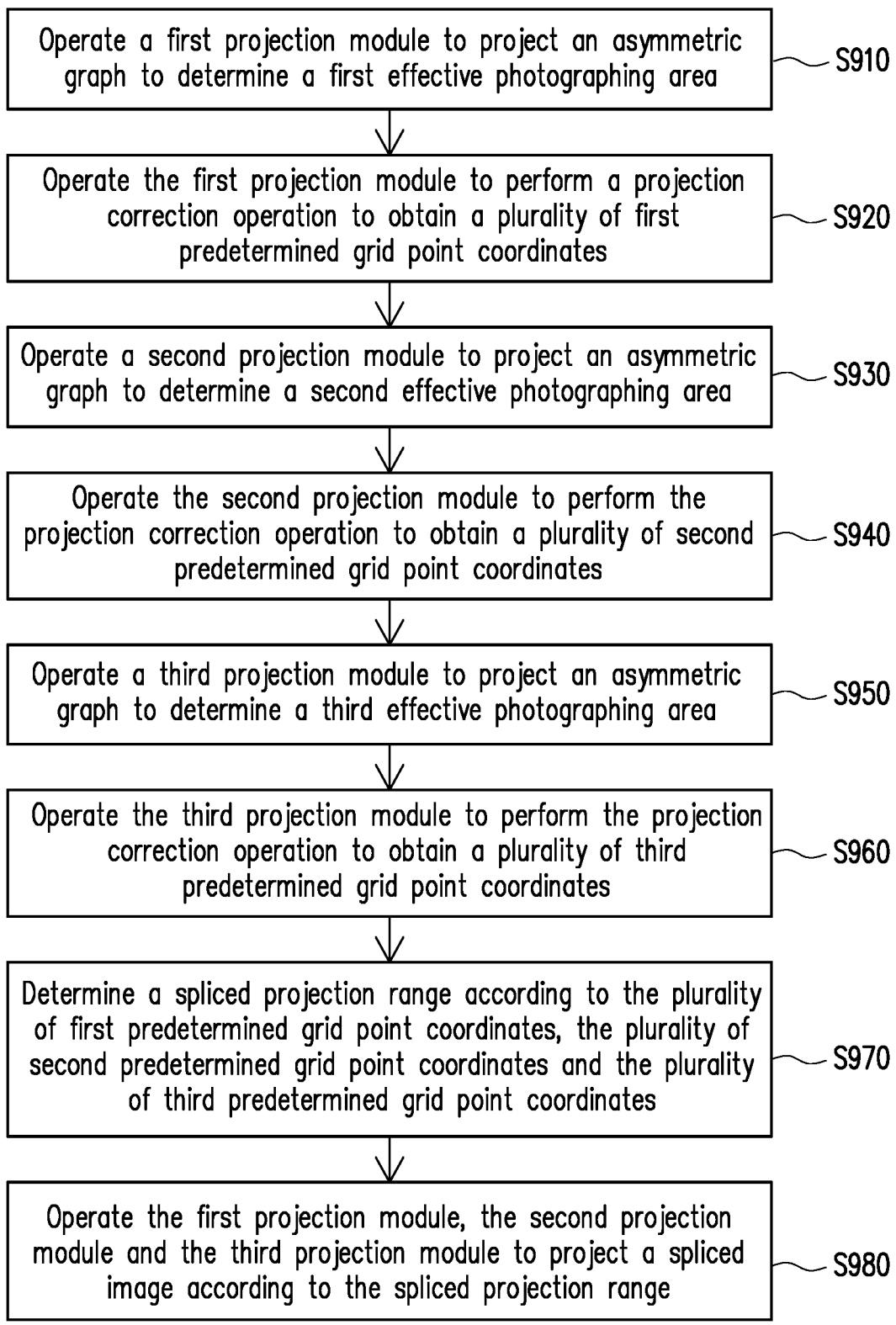
FIG. 9 is a flowchart illustrating a projection method according to another embodiment of the invention.

FIG. 9 is a flowchart illustrating a projection method according to another embodiment of the invention. Referring to FIG. 7 to FIG. 9, the projection system 800 may execute following steps S910-S980. In the step S910, the projection system 800 operates the first projection module 821 to project an asymmetric graph to determine a first effective photographing area. In the step S920, the projection system 800 operates the first projection module 821 to perform a projection correction operation to obtain a plurality of first predetermined grid point coordinates of the plurality of first predetermined positioning grid points G3. In the step S930, the projection system 800 operates the second projection module 822 to project an asymmetric graph to determine a second effective photographing area. In the step S940, the projection system 800 operates the second projection module 822 to perform the projection correction operation to obtain a plurality of second predetermined grid point coordinates of the plurality of second predetermined positioning grid points G4. In the step S950, the projection system 800 operates the third projection module 823 to project an asymmetric graph to determine a third effective photographing area. In the step S960, the projection system 800 operates the third projection module 823 to perform the projection correction operation to obtain a plurality of third predetermined grid point coordinates of the plurality of third predetermined positioning grid points G5.

In the step S970, the projection system 800 determines the spliced projection range 740 according to the plurality of first predetermined grid point coordinates of the plurality of first predetermined positioning grid points G3, the plurality of second predetermined grid point coordinates of the plurality of second predetermined positioning grid points G4 and the plurality of third predetermined grid point coordinates of the plurality of third predetermined positioning grid points G5. In the step S980, the projection system 800 operates the first projection module 821, the second projection module 822 and the third projection module 823 to project a spliced image according to the spliced projection range 740. Therefore, according to the projection method of the embodiment, the projection system 800 may effectively project a large range projection image with good splicing quality.

Moreover, with regard to related module features, technical details, and implementation methods of the projection system 800 of the embodiment, sufficient instructions, recommendations, and implementation descriptions may be obtained by referring to the descriptions of the embodiments of FIGS. 1 to 9, and details thereof are not repeated.

In summary, the projection system and the projection method of the invention may first project the first projection image with an asymmetric graph, and analyze whether an asymmetric graph in the first photographed image output by the photographing module is consistent with the geometric configuration of the asymmetric graph of the first projection image projected, so as to determine the effective photographing area. Then, the projection system and the projection method of the invention may project the full grid point image through the projection module, and the photographing module outputs the full grid point photographed image based on the effective photographing area, so as to compare positions of a plurality of positioning grid points in the full grid point projection image and the full grid point photographed image to effectively implement projection positioning. Moreover, the projection system and the projection method of the invention may be applied to a projection system composed of a plurality of projection module, so as to effectively project the spliced projection image with good projection effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
  a processing module;

a projection module, coupled to the processing module, and configured to project a first projection image, wherein the first projection image comprises a first asymmetric graph; and a photographing module, coupled to the processing module, and configured to capture at least a part of the first projection image based on a photographing range, so as to output a first photographed image, wherein the first photographed image comprises at least one second asymmetric graph, wherein the processing module is configured to analyze the first photographed image to determine whether the at least one second asymmetric graph is consistent with a geometric configuration of the first asymmetric graph, and is configured to determine an effective photographing area by excluding areas in the first photographed image that are inconsistent with the first projection image, according to one of the at least one second asymmetric graph that is consistent with the geometric configuration of the first asymmetric graph in the first photographed image.

2. The projection system as claimed in claim 1, wherein the effective photographing area comprises one of the at least one second asymmetric graph that is consistent with the geometric configuration of the first asymmetric graph, and the effective photographing area does not comprise other second asymmetric graphs that are not consistent with the geometric configuration of the first asymmetric graph.

3. The projection system as claimed in claim 1, wherein the projection module projects a second projection image, and the photographing module captures at least a part of the second projection image based on the photographing range to output a second photographed image, wherein the processing module compares the first photographed image with the second photographed image to determine whether the projection module re-projects the first projection image.

4. The projection system as claimed in claim 3, wherein the second projection image is a blank projection image.

5. The projection system as claimed in claim 1, wherein the first asymmetric graph comprises three first positioning grid points, and the three first positioning grid points are arranged in a right triangle, and a plurality of distances between the three first positioning grid points are unequal distances.

6. The projection system as claimed in claim 5, wherein the processing module analyzes the three first positioning grid points in the first photographed image to obtain three first grid point coordinates, and the processing module deduces a plurality of predetermined grid point coordinates corresponding to a plurality of predetermined positioning grid points in a whole projection range one by one according to the three first grid point coordinates, wherein the processing module determines a projection result of the projection module in the projection range according to the plurality of predetermined grid point coordinates.

7. The projection system as claimed in claim 6, wherein the projection module projects a full grid point projection image, and the photographing module captures at least a part of the full grid point projection image base on the effective photographing area to output a full grid point photographed image, wherein the processing module sequentially compares a plurality of second grid point coordinates of a plurality of second positioning grid points of the full grid point photographed image with the plurality of predetermined grid point coordinates, so as to determine whether to adjust the predetermined grid point coordinates.

8. The projection system as claimed in claim 6, further comprising:

another projection module, coupled to the processing module, and configured to project another first projection image, the another first projection image comprises another first asymmetric graph, wherein the photographing module captures at least a part of the another first projection image based on the photographing range, so as to output another first photographed image, wherein the another first photographed image comprises at least one another second asymmetric graph, wherein the processing module is configured to analyzes the another first photographed image to determine whether the at least one another second asymmetric graph is consistent with another geometric configuration of the another first asymmetric graph, and the processing module is configured to determines another effective photographing area by excluding areas in the first photographed image that are inconsistent with the first projection image, according to one of the at least one another second asymmetric graph that is consistent with the another geometric configuration of the another first asymmetric graph in the another first photographed image.

9. The projection system as claimed in claim 8, wherein the another first asymmetric graph comprises three other first positioning grid points, and the processing module analyzes the three other first positioning grid points in the another first photographed image to obtain three other first grid point coordinates, and the processing module deduces a plurality of other predetermined grid point coordinates corresponding to a plurality of other predetermined positioning grid points in another whole projection range one by one according to the three other first grid point coordinates, wherein the processing module determines a projection result of the another projection module in the another projection range according to the plurality of other predetermined grid point coordinates.

10. The projection system as claimed in claim 9, wherein the processing module determines a spliced projection range of the projection module and the another projection module according to the plurality of predetermined grid point coordinates and the plurality of other predetermined grid point coordinates, and an area of the spliced projection range is smaller than or equal to a sum of areas of the projection range and the another projection range.

11. A projection method, comprising:

projecting a first projection image, wherein the projection image comprises a first asymmetric graph;

capturing at least a part of the first projection image based on a photographing range, so as to output a first photographed image, wherein the first photographed image comprises at least one second asymmetric graph;

analyzing the first photographed image to determine whether the at least one second asymmetric graph is consistent with a geometric configuration of the first asymmetric graph; and determining an effective photographing area by excluding areas in the first photographed image that are inconsistent with the first projection image, according to one of the at least one second asymmetric graph that is consistent with the geometric configuration of the first asymmetric graph in the first photographed image.

12. The projection method as claimed in claim 11, wherein the effective photographing area comprises one of the at least one second asymmetric graph that is consistent with the geometric configuration of the first asymmetric graph, and the effective photographing area does not comprise other second asymmetric graphs that are not consistent with the geometric configuration of the first asymmetric graph.

13. The projection method as claimed in claim 11, further comprising:
projecting a second projection image;
capturing at least a part of the second projection image based on the photographing range to output a second photographed image; and
comparing the first photographed image with the second photographed image to determine whether to re-project the first projection image.

14. The projection method as claimed in claim 13, wherein the second projection image is a blank projection image.

15. The projection method as claimed in claim 11, wherein the first asymmetric graph comprises three first positioning grid points, and the three first positioning grid points are arranged in a right triangle, and a plurality of distances between the three first positioning grid points are unequal distances.

16. The projection method as claimed in claim 15, further comprising:
analyzing the three first positioning grid points in the first photographed image to obtain three first grid point coordinates,
deducing a plurality of predetermined grid point coordinates corresponding to a plurality of predetermined positioning grid points in a whole projection range one by one according to the three first grid point coordinates; and
determining a projection result in the projection range according to the plurality of predetermined grid point coordinates.

17. The projection method as claimed in claim 16, further comprising:
projecting a full grid point projection image;
capturing at least a part of the full grid point projection image base on the effective photographing area to output a full grid point photographed image; and
sequentially comparing a plurality of second grid point coordinates of a plurality of second positioning grid points of the full grid point photographed image with the plurality of predetermined grid point coordinates, so as to determine whether to adjust the predetermined grid point coordinates.

18. The projection method as claimed in claim 16, further comprising:
projecting another first projection image, wherein the another first projection image comprises another first asymmetric graph;
capturing at least a part of the another first projection image based on the photographing range, so as to output another first photographed image, wherein the another first photographed image comprises at least one another second asymmetric graph;
analyzing the another first photographed image to determine whether the at least one another second asymmetric graph is consistent with another geometric configuration of the another first asymmetric graph; and
determining another effective photographing area according to one of the at least one another second asymmetric graph that is consistent with the another geometric configuration of the another first asymmetric graph in the another first photographed image.

19. The projection method as claimed in claim 18, further comprising:
analyzing three other first positioning grid points in the another first photographed image to obtain three other first grid point coordinates;
deducing a plurality of other predetermined grid point coordinates corresponding to a plurality of other predetermined positioning grid points in another whole projection range one by one according to the three other first grid point coordinates; and
determining a projection result in the another projection range according to the plurality of other predetermined grid point coordinates.

20. The projection method as claimed in claim 19, further comprising:
determining a spliced projection range according to the plurality of predetermined grid point coordinates and the plurality of other predetermined grid point coordinates, wherein an area of the spliced projection range is smaller than or equal to a sum of areas of the projection range and the another projection range.

* * * * *